United States Patent [19]

Okazaki et al.

[11] Patent Number: 5,389,846
[45] Date of Patent: Feb. 14, 1995

[54] MINIATURE MOTOR

[75] Inventors: Akira Okazaki; Takanobu Lee; Ikuo Matsushita; Masao Take, all of Matsudo, Japan

[73] Assignee: Mabuchi Motor Co., Ltd., Matsudo, Japan

[21] Appl. No.: 49,674

[22] Filed: Apr. 16, 1993

[30] Foreign Application Priority Data

Apr. 22, 1992 [JP] Japan ............... 4-026156[U]

[51] Int. Cl.[6] ........................................... H02K 11/00
[52] U.S. Cl. ................................. 310/40 MM; 310/71
[58] Field of Search ............ 310/40 MM, 71, 194, 310/DIG. 6; 336/192

[56] References Cited

U.S. PATENT DOCUMENTS

| | | | |
|---|---|---|---|
| 3,843,946 | 10/1974 | Anderson et al. | 336/90 |
| 4,426,158 | 1/1984 | Müller et al. | 368/76 |
| 5,173,628 | 12/1992 | Yoshida et al. | 310/71 |

*Primary Examiner*—Steven L. Stephan
*Assistant Examiner*—Judson H. Jones
*Attorney, Agent, or Firm*—McGlew and Tuttle

[57] ABSTRACT

A miniature motor is provided with a rotor having a plurality of magnetic poles extending axially, which are disposed radially on the outer circumferential surface thereof, and a stator having two coils wound on coil bobbins and disposed axially in a housing formed into a bottomed hollow cylindrical shape. An end plate is fitted to an open end of the housing, in which a current feeding connector is provided, and a printed circuit board having at board end prongs carrying bonding pieces for electrically connecting to the connectors is interposed between the coil bobbins. Coil ends are connected directly to the bonding pieces of the printed circuit board.

3 Claims, 3 Drawing Sheets

MINIATURE MOTOR

BACKGROUND OF THE INVENTION AND RELATED ART STATEMENT

This invention relates to a miniature motor, such as a stepping motor, used in printers and facsimile machines, and more particularly to a miniature motor in which an improvement is made so that the ends of coils as the components of the stator are easily held in position and connected to power feeding lead wires.

Stepping motors as one type of miniature motors have heretofore been widely used as a drive source for various types of equipment, such as information processing equipment. One type of stepping motor has such a construction that two coils as the components of the-stator are disposed coaxially in the axial direction of the motor, as disclosed in Japanese Published Unexamined Patent Application No. Sho-61 (1986)-4459.

FIG. 1 is a longitudinal sectional view illustrating a stepping motor of a conventional type. In FIG. 1, reference numeral 1 refers to a housing formed of a metallic material, such as mild steel, into a bottomed hollow cylindrical shape, on the inner circumferential surface of which yokes 2 formed of a ferromagnetic material into an annular shape, coil bobbins 3 formed of an insulating material into an annular shape, and coils 4 wound on the coil bobbins 3 are provided. Numeral 5 refers to an end plate fitted to an open end of the housing 1.

Numeral 6 refers to a rotor formed of a permanent-magnet material, such as ferrite, into a cylindrical shape and having a plurality of magnetic poles extending axially, which are disposed radially on the outer circumferential surface thereof. Numeral 7 refers to a shaft fixedly fitted to the axial center of the rotor 6 and rotatably supported by bearings 8 provided on the housing 1 and the end plate 5.

With the aforementioned construction, as current is fed to the coils 4 via control equipment (not shown), the yokes 2 are excited by a combination of 2-phase currents flowing in the coils 4, driving the rotor 6 having a plurality of magnetic poles disposed on the outer circumferential surface thereof to cause to rotate in short and uniform angular movements, thus transmitting power to driven equipment in accordance with the short and uniform angular movements.

The coil 4 used in a stepping motor having the aforementioned construction is manufactured by winding a predetermined number of turns of a coil wire as the material of the coil 4 on the coil bobbin 3 with an end of the coil wire being secured, applying adhesive on the wound coil wire surface to prevent the wound coil wire from being frayed, and cutting the wound end of the coil wire. The winding operations up to this stage can be carried out a special purpose machine or a general purpose industrial robot, for example.

Next, a predetermined length of lead wire is connected by soldering to an end of each coil wire, and each connected part is covered with an insulating tape to ensure electrical insulation. Then, the entire wound coil wire surface is further covered with an insulating tape, with the lead wires being run along the wound coil wire surface, to prevent excessive tensile force from being exerted on the connected parts and ensure electrical insulation over the entire coil wire surface.

Aside from the preceding process of winding the coil wires on the coil bobbins 3 in the aforementioned coil winding process of the conventional type, the succeeding process of connecting lead wires to the coil wires wound on the coil bobbins involves low workability and efficiency because of reliance on manual operations.

To solve the above problems, a means of providing terminal pins on the outer periphery of the coil bobbins 3 and wrapping and soldering the ends of coil wires constituting the coils 4 onto the terminal pins has been proposed (refer to Japanese Published Unexamined Utility Model Application No. Hei-4 (1992)-4716). FIG. 2 is a cross-sectional view illustrating the essential part of an example of such a means. Like parts are indicated by like numerals in FIG. 1.

In FIG. 2, the coil bobbin 3 has a core 31 formed into a hollow cylindrical shape, and flanges 32, of a larger outside diameter than the outer diameter of the core 31, formed integrally at both end faces in the axial direction of the core 31. A terminal 33 having terminals 10 and a common terminal 11 is provided on any one of the flanges 32. To wind a coil 4, a wire leader 41 of a coil 4 is connected to any one of the terminals 10, and a wire tail end 42 thereof to the common terminal 11. Then, a wire leader 41 of another coil 4 constituting another phase is connected to the common terminal 11, and a wire tail end 42 thereof to the other terminal 10. The housing 1 has a notch 12 to allow the terminal 33 to protrude outward from the housing 1.

Whereas the aforementioned arrangement facilitates the coil winding operation considerably, but still requires cumbersome operations of soldering lead wires to the terminals 10 and the common terminal 11, leading to low workability. When mounting connectors on the terminals 10 and the common terminal 11, the connectors being mounted have to be held in proper positions. This entails troublesome operations and low reliability in terms of strength in the mounting and connecting parts.

SUMMARY OF THE INVENTION

This invention is intended to Solve the problems inherent in the prior art. Accordingly, it is an object of this invention to provide a miniature motor in which coil ends can be easily secured in position and connected to power feeding lead wires, and high reliability in terms of strength in the connecting parts is ensured.

BRIEF DESCRIPTION OF THE DRAWINGS

FIG. 7 is an enlarged perspective view illustrating the printed-circuit board in FIGS. 4 through

DETAILED DESCRIPTION OF THE EMBODIMENTS

Figure 1:
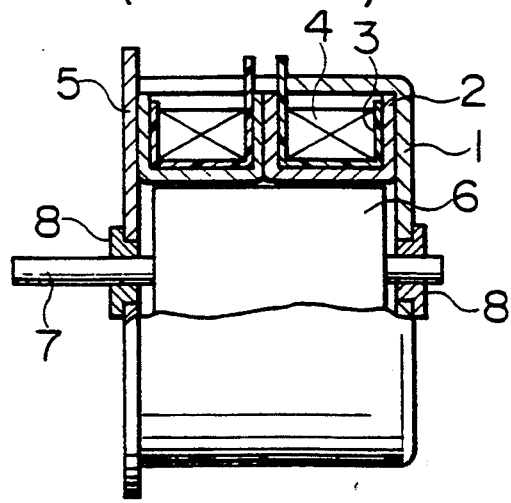
FIG. 1 is a longitudinal sectional view showing the essential part of a stepping motor of a conventional type.
Figure 2:
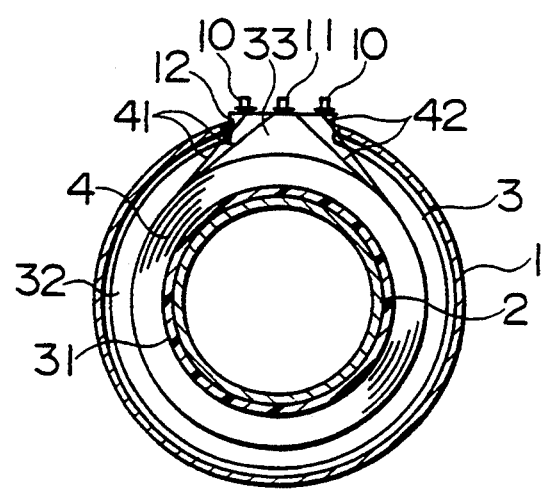
FIG. 2 is a longitudinal sectional view showing the essential part of another example of a coil bobbin of a conventional type.
Figure 3:
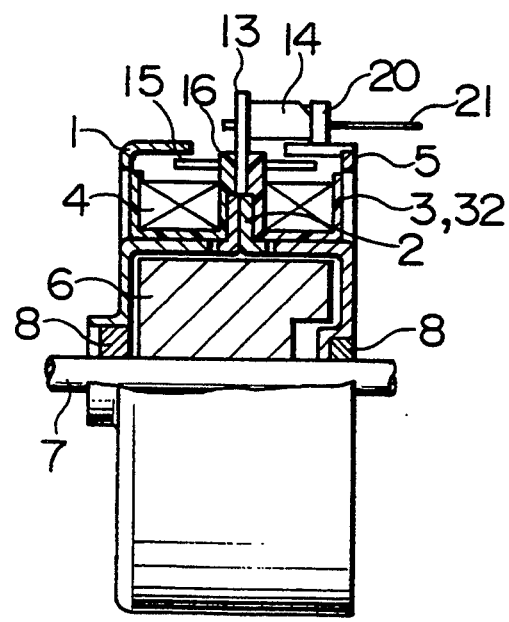
FIG. 3 is a longitudinal sectional view showing the essential part of an embodiment of this invention.

FIG. 3 is a longitudinal sectional view illustrating an embodiment of this invention. Like parts are indicated by like numerals in FIGS. 1 and 2. In FIG. 3, numeral 13 refers to a printed circuit board, 14 to a connector both fixedly fitted in advance to each other by soldering and other appropriate means, and fixed by a protruded part 16 provided on one of the flanges 32 of the coil bobbins 3 in such a manner as to protrude in the direction perpendicular to the axial line. Numeral 15 refers to a projection provided on the protruded part 16 in such a manner as will be described later. Numeral 20 refers to a connector for connecting the lead wire 21, formed in such a manner as to engage with and disengage from the connector 14.

Figure 4:
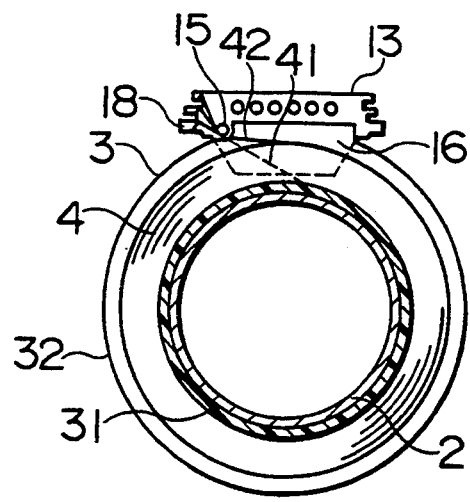
FIGS. 4 and 5 are a cross sectional view and a longitudinal sectional view of coil component members shown in FIG. 3.
Figure 5:
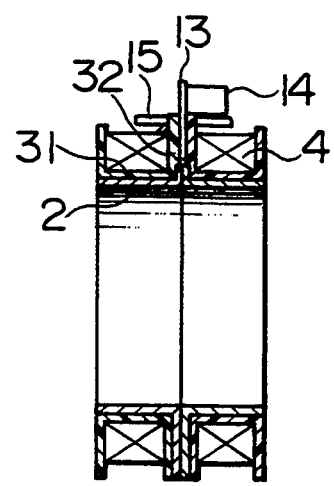
Figure 6:
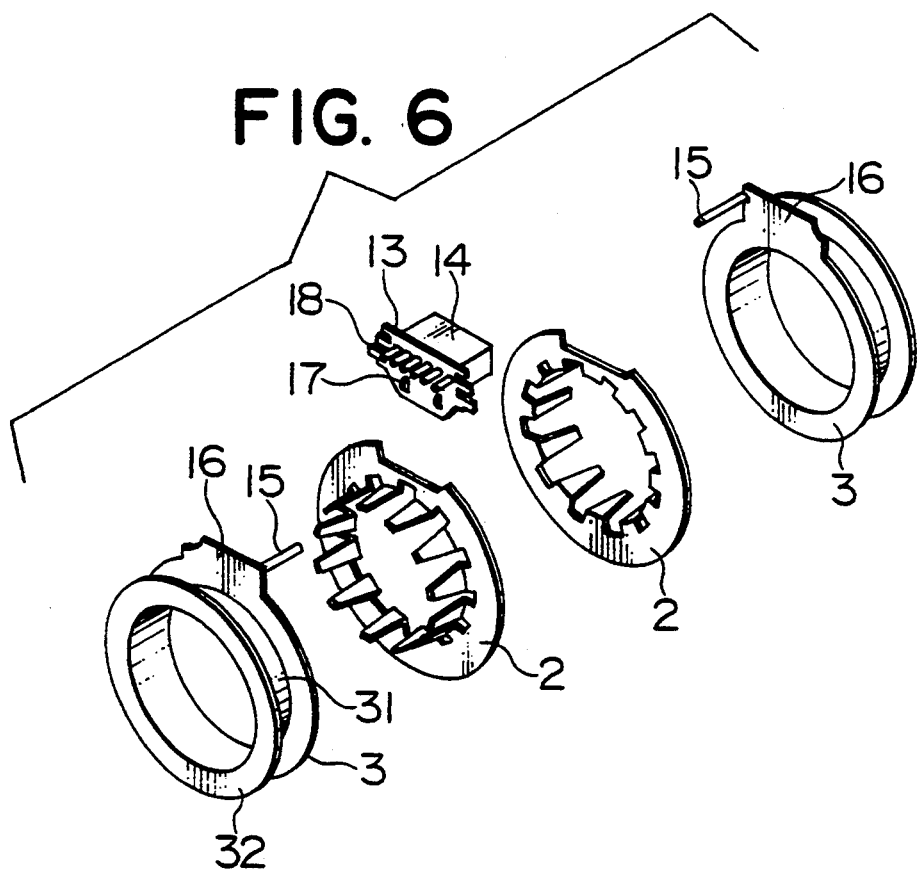
FIG. 6 is a perspective exploded view showing the component members in FIGS. 4 and 5.

FIGS. 4 and 5 are a cross sectional view and a longitudinal view illustrating the coil component members shown in FIG. 3. FIG. 6 is a perspective view illustrating the component members in FIGS. 4 and 5 in an exploded state. In FIGS. 4 through 6, numeral 15 refers to a projection provided on the protruded part 16 so that the projection 15 protrudes outward from the core 31 in the axial direction. The two coil bobbins 3 are arranged in such a manner that the projection 15 of one coil bobbin 3 faces the core 31 of another coil bobbin 3 when the projections of the coil bobbins 3 are disposed facing each other.

Figure 7:
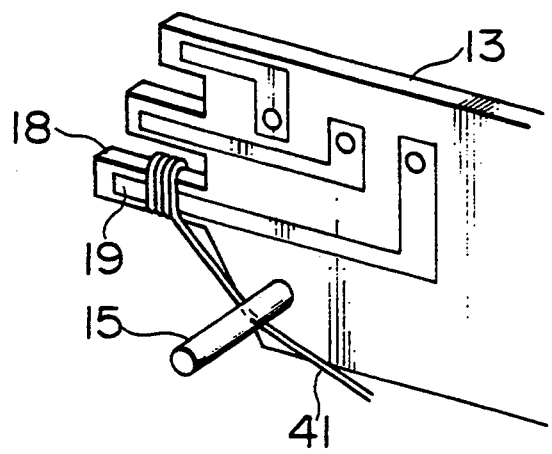

FIG. 7 is an enlarged perspective view illustrating the essential part of the printed circuit board 13 shown in FIGS. 4 through 6. In FIG. 7, bonding pieces 19 for electrically connecting to the connector 14 (not shown—see FIG. 6.) are provided at board end prongs 18 on the side of the printed circuit board 13. The board end prongs 18 are adapted so that the wire leaders 41, for example, can be hooked on the board end prongs 18 for electrical connection. Out of the three board-end prongs, any one prong 18 may be used as a common terminal (corresponding to the common terminal 11 in FIG. 2 above), and the other two prongs 18 as terminals for the wire leaders and tail ends of coils having different phases.

When assembling the coil bobbins 3 having the aforementioned construction, two coil bobbins 3 shown in FIG. 6, on the cores 31 of which the coils 4 (not shown in the figure—see FIGS. 3 through 5) have been wound, are prepared in advance. The ends of wires, i.e., wire leaders and tail ends of coil wires being wound into coils 4 are temporarily hooked in advance on projections (not shown) provided integrally on the outer periphery of the flanges 32 of the coil bobbins 3, for example.

Next, the two coil bobbins 3 are assembled by mounting the yokes 2 on the coil bobbins 3, and interposing the printed ciruit board 13, to which the connector 14 is fixedly fitted, between the two coil bobbins 3. As the coil bobbins 3 are assembled in the aforementioned manner, the projection 15 provided on the protruded part 16 on one coil bobbin 3 is passed through a through hole 17 provided on the printed circuit board 13 and disposed in such a manner as to face the core 31, that is, the coil 4 of the other coil bobbin 3. In this state, the wire leaders 41 and the wire tail ends 42 (not shown—see FIGS. 4 and 5 ) of the coils 4 are removed from the projections on the outer periphery of the flanges 32, and wound on the board end prongs 18 of the printed circuit board 13 from under the projections 15, as shown in FIGS. 4 and 5, and secured in position by soldering. After the wire leader 41 and the wire tail end 42 of each coil 4 are fixed to the board end prongs 18 of the printed circuit board 13, the entire assembly is placed in the housing 1 shown in FIG. 3.

This invention having the aforementioned construction and operation makes it easy to fix the ends of the coils constituting the stator and to connect the coil ends and the lead wires. Since the lead wires can be connected to the connector after assembly, assembly operation can be performed with no lead wires connected during the assembly process of miniature motors. This leads to improved workability and productivity.

What is claimed is:

1. A miniature motor, comprising:
   a rotor having a plurality of magnetic poles extending axially, said poles being disposed on an outer circumferential surface of said rotor;
   a housing formed into a bottomed hollow cylindrical shape;
   and end plate fitted to an open end of said housing;
   a stator having two coils wound on coil bobbins, said coil bobbins being disposed axially in said housing;
   a power feeding connector; and
   a printed circuit board having end prongs carrying bonding pieces, said printed circuit board being electrically connected to said power feeding connector, said printed circuit board being interposed between said coil bobbins, said coils having coil ends connected directly to said bonding pieces of said printed circuit board.

2. A miniature motor according to claim 1, wherein:
   said bonding pieces include three bonding pieces provided on said board end prongs of said printed circuit boards, one of said bonding pieces being employed as a common terminal and a remaining two of said bonding pieces being provided as terminals for connecting wire leaders and tail ends of said coils, the coils being supplied with current of a different phase.

3. A miniature motor according to claims 1, wherein:
   projections are provided on flanges of said coil bobbins, each of said projections protruding in a direction perpendicular to the an axial line of said coil bobbins, each projection passing through said printed circuit board and being disposed facing a coil bobbin on which another projection is provided;
   coil ends are connected to said bonding pieces on said board end prongs of said printed circuit board via said projections.

* * * * *